(12) United States Patent
Sumner

(10) Patent No.: US 9,909,804 B2
(45) Date of Patent: Mar. 6, 2018

(54) METHOD OF COOLING USING EXTENDED BINARY REFRIGERATION SYSTEM

(71) Applicant: Lummus Technology Inc., Bloomfield, NJ (US)

(72) Inventor: Charles Sumner, Tucson, AZ (US)

(73) Assignee: Lummus Technology Inc., Bloomfield, NJ (US)

( * ) Notice: Subject to any disclaimer, the term of this patent is extended or adjusted under 35 U.S.C. 154(b) by 77 days.

(21) Appl. No.: 15/173,060

(22) Filed: Jun. 3, 2016

(65) Prior Publication Data

US 2016/0282043 A1 Sep. 29, 2016

Related U.S. Application Data

(63) Continuation of application No. 13/057,368, filed as application No. PCT/US2008/009418 on Aug. 6, 2008, now abandoned.

(51) Int. Cl.
| | |
|---|---|
| *F25J 1/02* | (2006.01) |
| *F25J 3/06* | (2006.01) |
| *C09K 5/04* | (2006.01) |
| *F25J 3/02* | (2006.01) |

(52) U.S. Cl.
CPC .............. *F25J 3/061* (2013.01); *C09K 5/042* (2013.01); *F25J 3/0219* (2013.01); *F25J 3/0233* (2013.01); *F25J 3/0238* (2013.01); *F25J 3/0252* (2013.01); *C09K 2205/12* (2013.01); *F25J 2205/04* (2013.01); *F25J 2210/12* (2013.01); *F25J 2215/62* (2013.01); *F25J 2270/12* (2013.01); *F25J 2270/18* (2013.01); *F25J 2270/66* (2013.01); *F25J 2270/902* (2013.01)

(58) Field of Classification Search
CPC ........ F25J 3/0233; F25J 3/0219; F25J 3/0252; F25J 3/0238; F25J 2210/12; F25J 2270/12

See application file for complete search history.

(56) References Cited

U.S. PATENT DOCUMENTS

| | | | | |
|---|---|---|---|---|
| 3,914,949 | A | * 10/1975 | Maher | F25J 1/0212 62/47.1 |
| 5,679,241 | A | 10/1997 | Stanley et al. | |
| 5,979,177 | A | * 11/1999 | Sumner | C07C 7/04 62/612 |
| 6,705,113 | B2 | * 3/2004 | Wei | F25J 3/0219 62/612 |

OTHER PUBLICATIONS

Office Action dated Aug. 18, 2017 in corresponding Indian application No. 527/DELNP/2011, with translation (6 pages).
Subsequent Substantive Examination Report dated Apr. 21, 2017, by the Intellectual Property Office of The Philippines Bureau of Patents in corresponding Philippine Patent Application No. 1/2011/500246 (2 pages).

* cited by examiner

*Primary Examiner* — Frantz Jules
*Assistant Examiner* — Brian King
(74) *Attorney, Agent, or Firm* — Osha Liang LLP

(57) ABSTRACT

A method of cooling using an extended binary refrigerant system containing methane and a C3 hydrocarbon such as propylene and/or propane is disclosed. The extended binary refrigerant from a compressor final discharge is separated into a methane-rich vapor fraction and at least one C3 rich liquid fraction so as to provide various temperatures and levels of refrigeration in various heat exchange stages. The method and corresponding refrigeration system can be utilized in plants utilizing low pressure or high pressure demethanizers.

12 Claims, 6 Drawing Sheets

METHOD OF COOLING USING EXTENDED BINARY REFRIGERATION SYSTEM

CROSS-REFERENCE TO RELATED APPLICATIONS

This application, pursuant to 35 U.S.C. § 119(e), claims priority to U.S. application Ser. No. 13/057,368, filed Feb. 3, 2011, which claims the priority of PCT Application Serial No. US2008/009418, filed Aug. 6, 2008, which are herein incorporated by reference in their entirety.

BACKGROUND

The embodiments disclosed herein pertain to refrigeration systems and refrigeration methods.

Ethylene plants require refrigeration to separate out desired products from the cracking heater effluent. Typically, separate propylene and ethylene refrigeration systems are used. Often, particularly in systems using low pressure demethanizers where lower temperatures are required, a separate methane refrigeration system is also employed. Thus three separate refrigeration systems are required, cascading from lowest temperature to highest. Three compressor and driver systems complete with suction drums, separate exchangers, piping, etc. are used.

Mixed refrigerant systems are known. In these systems, multiple refrigerants are utilized in a single refrigeration system to provide refrigeration covering a wider range of temperatures, enabling one mixed refrigeration system to replace multiple pure component cascade refrigeration systems. These systems are characterized by mixtures of components with sequential carbon numbers. These mixed refrigeration systems have found widespread use in base load liquid natural gas plants.

The application of a binary mixed refrigeration system to ethylene plant design is disclosed in U.S. Pat. No. 5,979,177 in which the refrigerant is a mixture of methane (carbon number 1) and either ethylene or ethane (carbon number 2). A binary refrigeration system usually operates with a fixed composition at given temperature and pressure conditions. However, such a binary refrigeration system is limited in the temperature range over which the system can be operated and therefore it must be cascaded against a separate propylene refrigeration system that provides the refrigeration in the temperature range of −40° C. and warmer. Therefore, two separate refrigeration systems are required.

U.S. Pat. No. 6,637,237 teaches the use of a single refrigeration system for all of the refrigeration requirements of an ethylene plant. The refrigerant used is a mixture of methane, ethylene and propylene (carbon numbers 1, 2 and 3). The system is capable of supplying refrigeration at temperature levels from below −140° C. to near ambient temperature level.

U.S. Pat. No. 6,705,113 teaches the use of a single refrigeration system, again with three components, utilizing a different process configuration than U.S. Pat. No. 6,637,237. However, both U.S. Pat. No. 6,637,237 and U.S. Pat. No. 6,705,113 require three components to supply the required refrigeration duties at the required temperature levels. Using three components means that the composition at any given system temperature and pressure does not correspond to a unique composition but rather to a range of compositions. Thus, the composition of the refrigerant mixture at any given point in the system can vary. While this variation is small and does not appreciably detract from the performance of the refrigeration system, it may be preferable to operate a system that has no refrigerant composition variation at a given temperature and pressure to more easily adjust to changes in ethylene plant operating conditions.

SUMMARY OF THE CLAIMED EMBODIMENTS

It is an object of the embodiments disclosed herein to provide a simplified, single refrigeration system utilizing a mixture of methane with a C3 hydrocarbon as a binary refrigerant. As this binary system is not a continuous mixture of carbon number hydrocarbons but rather has only C1 and C3 hydrocarbon components, this system is referred to as an extended binary refrigerant. This extended binary system can be used to replace the separate propylene, ethylene and methane refrigeration systems associated with a recovery process using a low pressure demethanizer, or the binary or tertiary refrigeration systems utilizing hydrocarbons with consecutive carbon numbers. One use for the system is in an olefins plant.

One embodiment is a method comprising cooling a feed gas using an extended binary refrigerant containing a mixture of methane and a C3 hydrocarbon selected from the group consisting of propylene and propane, the extended binary refrigerant being compressed in a multistage compressor having a first stage and a last stage with a last stage discharge containing at least 60 mol % of the C3 hydrocarbon, and being divided into a liquid coolant stream and a gaseous coolant stream after compression.

The C3 hydrocarbon preferably is propylene. The last stage discharge typically contains at least 70 mol % propylene and sometimes at least 75 mol % propylene. In some cases, the last stage discharge contains 1040 mol % methane and 60-90 mol % C3 hydrocarbon.

Often, at least 90 wt % of the C3 hydrocarbon is propylene with the remainder being propane. Typically, the extended binary refrigerant contains 15-25 mol % methane and 75-85 mol % propylene, and sometimes 18-22 mol % methane and 78-82 mol % propylene. In many cases, the feed gas contains an olefin and the method comprises removing the olefin from the cooled feed gas by fractionation.

A further embodiment is a method for cooling with an extended binary refrigerant comprising: (a) compressing a mixture comprising 1040 mol % methane and 40-90 mol % of at least one C3 hydrocarbon selected from the group consisting of propylene and propane in a compressor to produce an extended binary refrigerant vapor, (b) cooling the extended binary refrigerant vapor to condense a portion thereof and provide a vaporous methane-rich binary refrigerant stream and a liquid C3 hydrocarbon-rich binary refrigerant stream, (c) employing the methane-rich binary refrigerant stream and the C3 hydrocarbon-rich binary refrigerant stream to effect cooling, and (d) returning the methane-rich binary refrigerant stream and the C3 hydrocarbon-rich binary refrigerant stream to the compressor.

Sometimes, in (c), the methane-rich binary refrigerant stream and the C3 hydrocarbon-rich binary refrigerant stream cool a charge gas comprising hydrogen, methane and ethylene. The charge gas typically is used to produce ethylene.

Yet another embodiment is a method to be used in the production of olefins from a charge gas containing hydrogen, methane, ethylene and optionally including other C2 and heavier hydrocarbons, wherein the charge gas is cooled by a refrigeration system having a series of heat exchangers. The charge gas is cooled in a method comprising: (a)

compressing an extended binary refrigerant vapor comprising a mixture of methane and a C3 hydrocarbon selected from the group consisting of propylene and propane in a multistage compressor having a first stage and a last stage with a last stage discharge; (b) cooling to condense a portion of the extended binary refrigerant vapor from the last stage discharge to form a remaining extended binary refrigerant vapor and a heavy refrigerant stream having a greater percentage of propylene than the selected mixture; (c) separating the heavy refrigerant stream from the remaining extended binary refrigerant vapor in a separator; (d) cooling to condense at least a portion of the remaining extended binary refrigerant vapor from the separator to form a light refrigerant stream; (e) bringing the heavy refrigerant stream and the light refrigerant stream into heat exchange contact with themselves and each other and with the charge gas in the series of heat exchangers whereby the charge gas is cooled, the heavy refrigerant stream is cooled and then heated and vaporized, and the light refrigerant stream is first cooled and at least partially condensed and then vaporized; and (f) returning the light refrigerant stream and the heavy refrigerant stream to the compressor.

A portion of the heavy refrigerant stream obtained in (c) preferably is used for cooling in (b). The light refrigerant stream can be partially condensed by the heavy refrigerant stream and further condensed through self-refrigeration. In some cases, the compressor includes an intermediate stage. The method sometimes further includes using the heavy refrigerant stream for cooling at least one of an ethylene fractionator, a deethanizer condenser and a depropanizer condenser.

The composition of propylene in the last compressor stage discharge often is greater than 50 mol percent. The composition of propylene in the heavy liquid refrigerant stream sometimes is greater than 80 mol percent. In some cases, the method for cooling is utilized to increase the total refrigeration capacity of an existing olefins plant employing a cascade refrigeration system having separate propylene and ethylene refrigeration systems.

In some cases, the method includes using the light liquid stream to provide additional refrigeration duty. In certain cases, the light refrigerant vapor, at low pressure, is injected into the liquid refrigerant stream entering an ethylene fractionator condenser, downstream of a valve regulating flow of the liquid refrigerant stream into the ethylene fractionator condenser. Optionally, the direct refrigeration duty of the extended binary refrigerant is decreased by heat exchange between an ethane recycle to a cracking heater that is produced at the bottom of the fractionating tower, after pressure letdown, and a gross overhead vapor flowing from the top of the fractionating tower. In another embodiment, the direct refrigeration duty of the extended binary refrigerant is decreased by heat exchange between an ethane recycle to a cracking heater that is produced at the bottom of the fractionating tower, after pressure letdown, and the refrigerant flowing to the ethylene fractionator condenser.

In some cases, the first light hydrocarbon separation tower is a depropanizer, and the depropanization is split into two towers, with one at a higher pressure. Sometimes the higher pressure tower overhead vapor is at least partially condensed in an interreboiler to provide reflux for the high pressure tower.

In one embodiment, the method further comprises the step of deethanizing the charge gas, wherein no deethanizer condenser is provided and reflux for the deethanizer is withdrawn proximate a feed tray where a deethanizer gross overhead enters the fractionating tower. The charge gas typically is derived from refinery offgases, the catalytic hydrogenation of propane, or steam cracking of hydrocarbons.

A further embodiment is an extended binary refrigerant comprising a mixture of methane and a C3 hydrocarbon selected from the group consisting of propylene and propane, the extended binary refrigerant containing 1040 mol % methane, 60-90 mot % of at least one C3 hydrocarbon selected from the group consisting of propylene and propane. The refrigerant contains no more than about 2 mol % hydrogen, with the total mol % of methane, C3 hydrocarbon and hydrogen being 100%. Usually, the extended binary refrigerant can provide refrigeration within the temperature range of about −136° C. to about 25'C.

The objects, arrangement and advantages of the refrigeration system and methods will be apparent from the description which follows.

DETAILED DESCRIPTION

Figure 1:
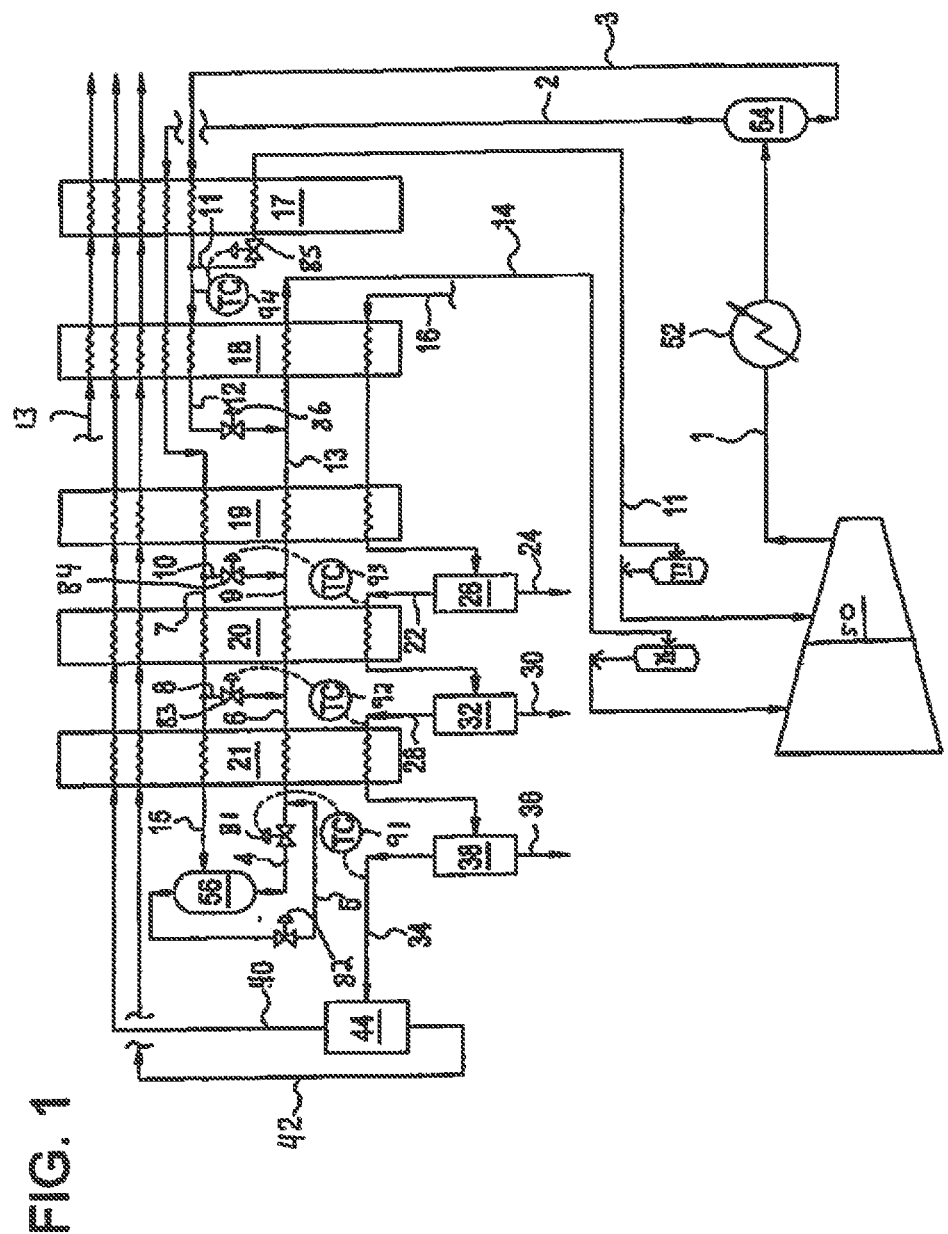
FIG. 1 is a schematic flow diagram of a first embodiment of a refrigeration system that is particularly applicable when additional refrigeration capability is required due to an expansion of olefin plant production capacity.

The disclosed embodiments involve the separation of the extended binary refrigerant from the discharge of the final stage of a compressor into at least one vapor enriched in methane content and at least one liquid enriched in propylene concentration so as to provide varying temperatures and levels of refrigeration in various heat exchange stages. It can be advantageous to cool and partially condense the vapor separated at the compressor discharge to provide a second vapor further enriched in methane concentration. The extended binary system not only can be used in an ethylene plant employing a low pressure demethanizer, but also can be applied to an ethylene plant with a high pressure demethanizer, in which case the binary system would typically only supply refrigeration at propylene and ethylene temperature levels. That is, the system would supply refrigeration temperature levels from just below ambient to approximately −100° C. with no refrigeration directly supplied at lower temperatures by the refrigeration system. The extended binary refrigeration system also can be used to supply refrigeration to recover ethylene from refinery offgases. Furthermore, the system can be used to supply refrigeration to recover propylene and byproduct ethylene produced by catalytic dehydrogenation of propane to form mostly propylene product. The system is applicable to any process where the range of temperatures for refrigeration duties is from ambient to about −136° C.

The method will be described in connection with an olefins plant which is primarily for the production of ethylene and propylene. In some cases, a pyrolysis gas is first processed to remove methane and hydrogen and then further processed to produce and separate selected olefins. The separation of the gases in an ethylene plant through condensation and fractionation at cryogenic temperatures requires refrigeration over a wide temperature range. The capital cost involved in the refrigeration system of an ethylene plant can be a significant part of the overall plant cost. Therefore, capital savings for the refrigeration system can significantly reduce the overall plant cost.

As used herein, "extended binary refrigerant" refers to a refrigerant system that includes two hydrocarbons with carbon numbers that differ by at least 2 and does not also include the intermediate hydrocarbon. For example, an extended binary refrigerant containing methane (a C1 hydrocarbon) and propylene and/or propane (C3 hydrocarbons) does not contain ethylene or ethane (C2 hydrocarbons).

Ethylene plants with high pressure demethanizers operate at pressures higher than 236 MPa (400 psi) with an overhead temperature typically in the range of −8° C. to 100° C. Ethylene refrigeration at approximately −100° C. to −102° C. is typically used to chill the gross demethanizer overhead vapors to produce reflux. An ethylene plant designed with a low pressure demethanizer which operates below about 2.41 MPa (350 psi) and generally in the range of 0345 to 1.034 MPa (50 to 150 psi) and with overhead temperatures in the range of −110° C. to −140° C. requires methane temperature levels of refrigeration to generate reflux. The advantages of the low pressure demethanizer are the lower total plant power requirement and the lower total plant capital cost while the disadvantage is the lower refrigeration temperature required and, therefore, the need for a methane refrigeration system in addition to the ethylene and propylene refrigeration systems. The separation of C3's requires temperatures ranging from ambient to −30° C. This represents the upper range of the extended binary temperature range.

The extended binary refrigerant comprises a mixture of methane with propylene and/or propane. Depending upon the source of the methane charge and makeup, a small quantity of hydrogen can also be present. The concentration of methane and propylene can vary depending on the ethylene plant cracking feedstock, the cracking severity and the chilling train pressure among other considerations, but will generally be in the range of 10 to 30 mol percent methane and 70 to 90 mot percent propylene as measured at the compressor discharge. A typical composition for an olefins plant with a low pressure demethanizer would be about 20 mol % methane and about 80 mol % propylene. The use of the single extended binary refrigerant provides all the refrigeration loads and temperatures required for an ethylene plant while obviating the need for two or three separate refrigerant systems. The refrigerant usually circulates in a closed loop system.

The purpose of the disclosed embodiments is to provide the necessary refrigeration to separate hydrogen and methane from the charge gas and provide the feed for the demethanizer. Optionally, the methods provide some or all of the other refrigeration requirements of the entire plant.

Before describing the extended binary refrigeration system, the flow of the charge gas through the system will be described with examples of specific temperatures being included for purposes of illustration only.

FIG. 1 depicts an enhanced binary refrigeration system design useful for adding incremental refrigeration capability to an existing olefins production plant that is being increased in capacity. The chilling train feed 16 or charge gas, which is the pyrolysis charge gas conditioned as required and cooled, is typically at a temperature of about 15° C. to 20° C. and a pressure of about 2 to 15 ?villa (approximately 280 to 500 psi), and is typically a vapor stream. In designs that employ both vapor and liquid hydrocarbon dryers, the feed to the chilling train is a combination vapor-liquid mixture. This stream contains hydrogen, methane, and C2 and heavier components including ethylene and propylene. The chilling train feed 16 is progressively cooled by the refrigeration system in the heat exchangers 18, 19, 20 and 21 with appropriate separations being made to produce demethanizer feeds.

In addition to the chilling train feed 16 and the binary refrigerant streams, there are various ethylene plant streams at various temperatures which also pass through the heat exchangers for recuperation of cold, such as stream 13.

The system shown in FIG. 1 utilizes two stages of compression to produce refrigeration from ambient temperature down to about −136° C. This design is complementary to an existing refrigeration system, either a classical cascade of propylene and ethylene refrigeration, a classical cascade of propylene, ethylene and methane refrigeration systems, or a mixed refrigeration system. The design as depicted provides only refrigeration for charge chilling and demethanization and does not provide for fractionation refrigeration for C2 and C3 separations.

The chilling train feed 16, is chilled in exchangers 18 and 19, and partially condensed and then separated into a vapor stream 22 and a liquid stream 24 in a separator 26. Liquid stream 24 flows to the demethanizer. Vapor stream 22 flows to heat exchanger 20 where it is cooled and partially condensed and then separated into a vapor stream 28 and a liquid stream 30 in a separator 32. Liquid stream 30 then flows to the demethanizer as the intermediate temperature liquid stream. Vapor stream 28 then flows to heat exchanger 21 where it is cooled and partially condensed and separated into a vapor stream 34 and liquid stream 36 in separator 38. The liquid stream 36 is the coldest demethanizer feed. Vapor stream 34 is further chilled (not shown on FIG. 1) and then separated into a hydrogen rich stream 40 and a methane rich stream 42 in a separator 44 and then returned to the binary refrigeration system heat exchanger network of exchangers 21, 20, 19, 18 and 17, respectively, for recovery of cold.

The extended binary compressor discharge stream 1, leaving the extended binary refrigeration compressor 50, usually contains at least 50 mol % C3 hydrocarbon, with the remainder being methane. In some cases, stream 1 contains 60-90 mol % propylene (or propane) and 10-40 mol % methane composition. As the methane makeup to the compressor system is withdrawn from the demethanizer net overhead vapor product without further processing, some hydrogen is contained and the methane content is reduced by a small amount, for example about 0.5 mol %, in the compressor discharge with a 0.5 mol % hydrogen content. Note that it is possible, and sometimes desirable to reduce the hydrogen content, for example by controlled venting in the refrigeration system.

Stream 1 is cooled by water or air, preferably cooling water, in heat exchanger 52 and partially condensed and then separated in a separator drum 54 into a vapor stream 2, and a liquid stream 3. The vapor stream 2, enriched in methane, is withdrawn from separator drum 54 and then cooled and eventually totally or mostly condensed in exchangers 17 through 21 and separated, if necessary, in separator drum 56. The condensed light refrigerant stream 4, is then let down across a control valve 81 and optionally any uncondensed vapor 5 is cooled by expansion to a low pressure using an optional control valve 82. Temperature controller 91 adjusts the pressure outlet from control valve 81. Valve 82 provides the pressure drop necessary to blend stream 5 with the discharge vapor from control valve 81. By raising or lowering the discharge pressure from control valve 81, the temperature entering exchanger 21 is raised or lowered in order to provide the required cooling for stream 28 and insure coldest liquid feed flow for the demethanizer via stream 36. In one embodiment, the temperature of stream 6, which is a combination of steams 4 and 5, after pressure letdown is about −136° C.

Similarly, a temperature controller 92 on the vapor stream 28 leaving drum 32 is used to let down a portion of the vapor stream 8 across a control valve 83 to be mixed into the combined partially reheated light refrigerant stream 6 to provide chilling to condense hydrocarbons to form the intermediate temperature demethanizer feed stream 30.

A temperature controller 93 on the vapor stream 22 leaving separator 26 similarly lets down some vapor stream 10 to be mixed with the partially reheated stream 9 across a control valve 84 to provide the chilling to form the warmest demethanizer feed, liquid stream 24.

Streams 8 and 10 are formed by the cooling of stream 2 through interchange in exchangers 19 and 20. The composition of these streams is unchanged as stream 2 cools to form streams 8, 10 and 15. Both the vapor and liquid from separator 56 are recombined and become part of streams 6, 9, and 13.

The heavy liquid stream 3, leaving separator drum 54 provides some of the refrigeration for chilling of the chilling train feed 16 in exchanger 18 and also chills and partially condenses light refrigerant stream 2 in exchangers 17 and 18. Stream 3 leaving separator drum 54 is chilled in heat exchanger 17 by reheat of process streams and by letting down a portion of the chilled heavy refrigerant of stream 3 to a lower pressure as stream 11. A temperature controller 94 on the remaining portion of stream 13, i.e. stream 12, lets down stream 11 across a control valve 85. Stream 11 is vaporized in exchanger 17, is routed to drum 77, and then flows to the second stage suction of compressor 50. The balance of the heavy refrigerant stream, liquid stream 12, is further cooled in exchanger 18. It is then let down to the lowest refrigerant pressure across control valve 86 providing additional cooling and then mixed with light refrigerant stream 13 to form stream 14. Light refrigerant stream 13 is the total light refrigerant and composed of streams 6, 8 and 10. The mixing of stream 12 with stream 13 lowers the temperature of stream 12 beyond that achieved by reducing the pressure. Stream 14 is then reheated in exchanger 18 and flows to first stage compression suction drum 76 and then to the compressor 50 as the first stage suction flow.

The process shown in FIG. 1 utilizes a single compressor and a refrigerant composed essentially of methane and propylene to provide refrigeration from just below ambient temperature down to a temperature of about −136° C. This is beyond the range of any binary system utilizing consecutive carbon numbers. As indicated above, FIG. 1 depicts a system for the expansion of an olefins plant. Only a portion of the refrigeration demands of the olefins plant is net with this configuration.

Figure 2:
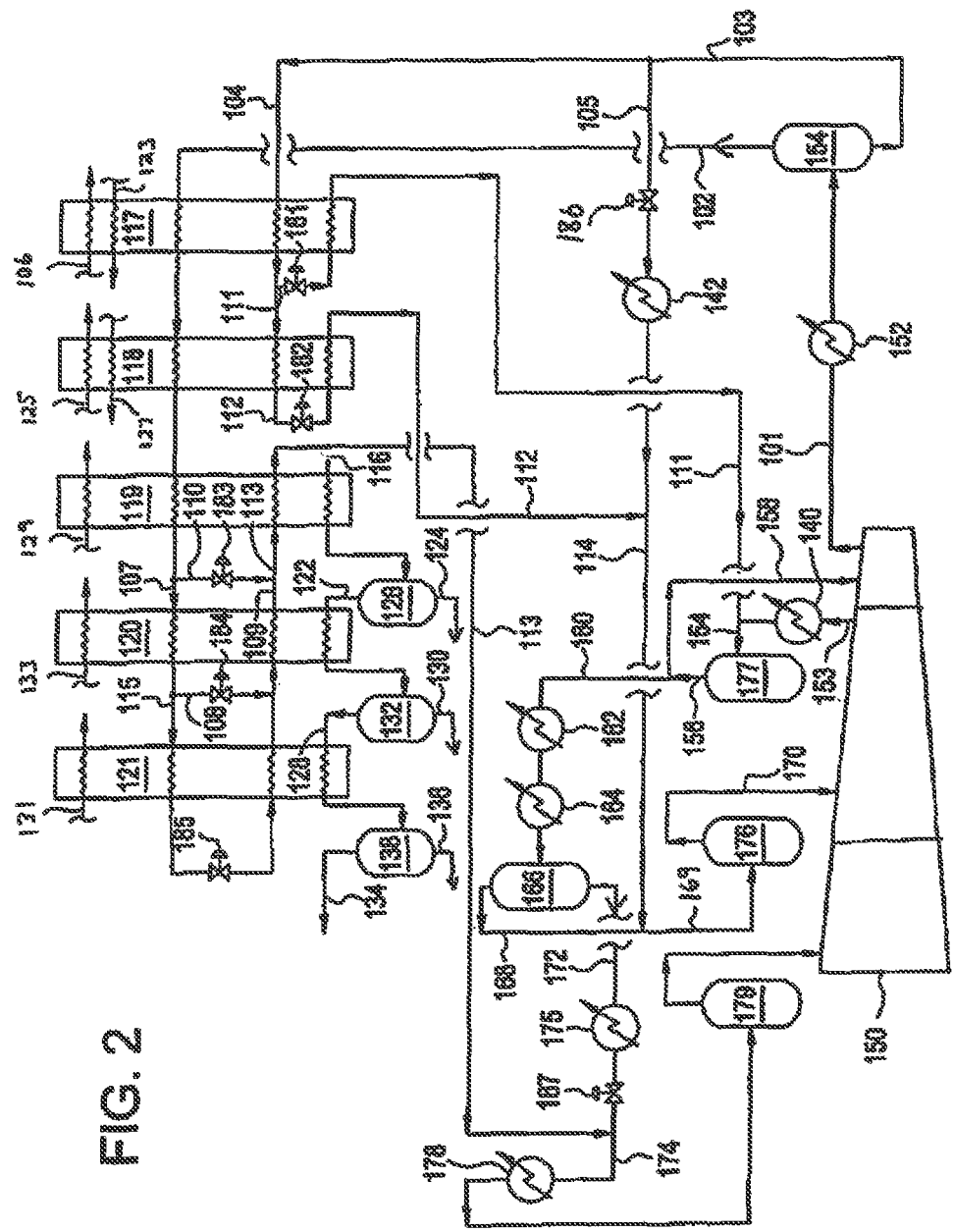
FIG. 2 is a schematic flow diagram of a general application of the extended binary refrigeration concept that is applicable to a new olefins plant design or to a major expansion of an olefins plant requiring a significant refrigeration supply increase.

FIG. 2 depicts an extended binary refrigeration system for a complete olefins plant. All of the refrigeration requirements of the process associated with an olefins plant separation system design, whether a completely new plant or an expansion can be supplied by this configuration. FIG. 2 describes an olefins plant design utilizing a front end depropanizer as the first light hydrocarbon separation distillation system. However, the extended binary refrigeration concept can also be utilized to supply the refrigeration requirements of an olefins plant with a demethanizer or deethanizer as the first light hydrocarbon separation tower system, as well as other distillation or fractionation concepts that will separate and purify the products of a steam cracker charging a hydrocarbon feed and producing cracked products therefrom.

Vapor stream 101, leaving compressor 150 is cooled by an ambient temperature cooling medium such as cooling water or air, preferably cooling water, in a heat exchanger 152 to near ambient temperature. The mixed vapor and liquid stream then flows to separator drum 154 where it is separated into vapor stream 102 and liquid stream 103. In one embodiment, vapor stream 101 has a composition of about 10-40 met % methane, or about 20-30 mol % methane, and about 60-90 mol % propylene, or about 70-80 mol % propylene. The composition depends upon the feedstock to the steam cracking heaters and the conditions under which the hydrocarbon is cracked, and also upon whether any additional olefin-containing streams are flowing to the olefins plant for recovery of products. In addition, although the refrigerant is mainly a binary mixture of methane and propylene, it is recognized that some hydrogen can be contained as a consequence of the source of the methane charge and makeup and some propane can be contained as a consequence of the source of the propylene charge and makeup to the enhanced binary refrigeration system.

In some cases, the vapor stream 102 leaving separator 154 has a nominal methane concentration of 52-55 mol % for a typical naphtha cracker at 0.50 to 0.55 weight propylene to ethylene ratios leaving the cracking heater. For lighter hydrocarbon feedstocks and higher cracking heater cracking severities, methane concentration can increase up to 65 mol %. For heavier feedstocks cracked at lower severities methane concentration sometimes can decrease to 45 mol %.

The liquid stream 103 leaving separator 154 sometimes has a nominal propylene concentration of 80 to 90 mol %. With varying process conditions, propylene concentration can be as low as 70-75 mol % and as high as 92 mol %.

A portion of liquid stream 103, stream 104, is chilled in heat exchanger 117, typically of a core or brazed aluminum exchanger design. Chilling is provided by process reheats as available including process stream 106 and by letting down a portion of the chilled stream 104 as stream 111, across control valve 181, with subsequent reduction in pressure and temperature, and using this stream to provide chilling for streams 102 and 104 and for chilling other process loads, as required, including stream 123. This vaporized stream 111 then flows to a compressor second stage discharge drum 177.

The balance of stream 104, after withdrawal of stream 111, is stream 112 and this stream is chilled in exchanger 118. Exiting exchanger 118, the chilled stream 119 is let down through valve 182, resulting in a reduction in pressure and temperature and then flows back to exchanger 118 to be vaporized and reheated before flowing to a compressor second stage suction drum 176. Chilling is also provided by process reheats as available, such as stream 125. The refrigeration provided is utilized to chill process streams, as required, such as stream 127, and to chill stream 102.

Vapor stream 102 having been chilled and partially condensed in exchangers 117 and 118 is further chilled and totally or mostly condensed by consecutive chilling in exchangers 119, 120, and 121. The chilling in heat exchanger 119 is provided by process reheats as available, such as in stream 129, and by letting down a first portion of chilled stream 102, as stream 110, across valve 183, with pressure reduction to near the suction pressure of the extended binary refrigeration compressor 150. The remaining portion of stream 102 is stream 107, and after passing through heat exchanger 120, a portion of this stream is let down as stream 108 across control valve 184. The remaining portion of stream 107 is stream 115, and this stream is chilled in heat exchanger 121. Stream 115 after exiting exchanger 121 is let down across valve 185, reducing both pressure and temperature. This stream now represents the coldest temperature of the system. As with the system in FIG. 1, it is used to generate the coldest demethanizer feed by cooling stream 128 to form liquid stream 136. This partially reheated stream 115 is then combined with stream 108 to form stream 109. Not shown in FIG. 2 are the temperature controllers on steams 122, 128 and 134 that adjust the letdown valves 183, 184 and 185 to insure the formation of demethanizer feeds 130 and 124.

Stream 109 is partially reheated in heat exchanger 120 using process reheats, as available, including stream 133, and combined with stream 110, with the combined stream 113 being reheated in heat exchanger 119. The refrigeration provided is utilized to cool and partially condense the chilling train feed 116 which then exits exchanger 119 and flows to separator drum 126. A liquid stream 124 is separated and flows to the demethanizer. The vapor stream 122 leaving separator 126 flows to heat exchanger 120 where it is chilled and partially condensed and then flows to separator drum 132. In drum 132, stream 122 is separated into a liquid stream 130 and a vapor stream 128. Liquid stream 130 flows to the demethanizer as the intermediate temperature feed.

Vapor stream 128 exits separator drum 132 and flows to heat exchanger 121 where it is further chilled and partially condensed. Exiting heat exchanger 121 the stream is separated into a liquid stream 136 and a vapor stream 134 in a separator drum 138. Liquid stream 136 flows to the demethanizer as the coldest feed. Vapor stream 134 is further processed for separation into hydrogen-rich and methane rich streams. Chilling of stream 128 is provided by process reheats as available, including stream 131, and by pressure let down of stream 115 across valve 185 and reheating and partially vaporizing in exchanger 121.

In this design, no demethanizer overhead condenser is provided as stream 136 is chilled to a sufficiently low temperature such that reflux is not required. Thus, the demethanizer is a stripping column. This embodiment can also be configured to enable cooling of the demethanizer gross overhead vapor to provide reflux as an alternate process design approach.

Liquid stream 105 is withdrawn from stream 103 and is let down in pressure across control valve 186 to provide chilling for the low pressure depropanizer condenser 142. After vaporization, stream 105 is then combined with vaporized stream 112 as stream 114. This stream is combined with stream 168 as stream 169 and flows to an extended binary refrigeration compressor second stage suction drum 176.

Second stage discharge vapor 153 from the compressor 150 is chilled by cooling water in exchanger 140 and then combined with vaporized stream 111 as stream 154 before flowing to the extended binary refrigeration 2nd stage discharge drum 177. Stream 156 exits drum 177, and a portion of this stream, stream 158, returns to the extended binary refrigeration compressor 150 as the 3rd stage suction flow. The remaining portion 160 flows first to the ethylene fractionator reboiler 162 and then to the ethylene fractionator side reboiler 164 where it is mostly but not totally condensed before flowing to separator drum 166.

The vapor stream 168 leaving separator drum 166 is combined with reheated stream 114 and flows to the extended binary refrigeration compressor second stage suction drum 176. The vapor stream 170 leaving the drum 176 is the second stage suction flow to the compressor 150.

The liquid stream 172 leaving drum 166 is heated in heat exchanger 175 and is then let down across valve 187 to near the suction pressure of the extended binary refrigeration compressor first stage suction. The expanded stream is then combined with stream 113 to form stream 174, which is a mixed vapor and liquid stream. The higher methane concentration reheated stream 113, when injected into expanded stream 172 further lowers the temperature of the combined expanded stream 174. Stream 174 then flows to the ethylene fractionator overhead condenser 178 and is vaporized providing chilling to condense reflux to enable the separation of polymer grade ethylene from ethane. Because of the injection of stream 113 into stream 172, the pressure of stream 174 can be higher while maintaining an economical temperature differential in the exchanger 175. As the vaporized stream 174 flows to drum 179 and then subsequently becomes the suction flow to the extended binary refrigeration compressor 150, a higher pressure decreases the power required by the refrigeration compressor 150.

The process design depicted in FIG. 2 utilizes some heat exchange concepts that facilitate the balancing of vapor and liquid flows in the extended binary refrigeration compressor. The ethane recycle from the bottom of the ethylene fractionator is let down to near the inlet pressure of the cracking heaters and is then vaporized in an exchanger 175, located in the overhead of the ethylene fractionator, reducing the duty of exchanger 178 and chilling the refrigerant 172 flowing to exchanger 178. Use of a vapor withdrawal 160 from the second stage of the extended binary refrigeration compressor 150 allows for additional process heat flexibility thus allowing the system to have a wider range of duties for providing refrigeration for a new olefins unit or major expansion as compared to a smaller expansion as in FIG. 2.

Figure 3:
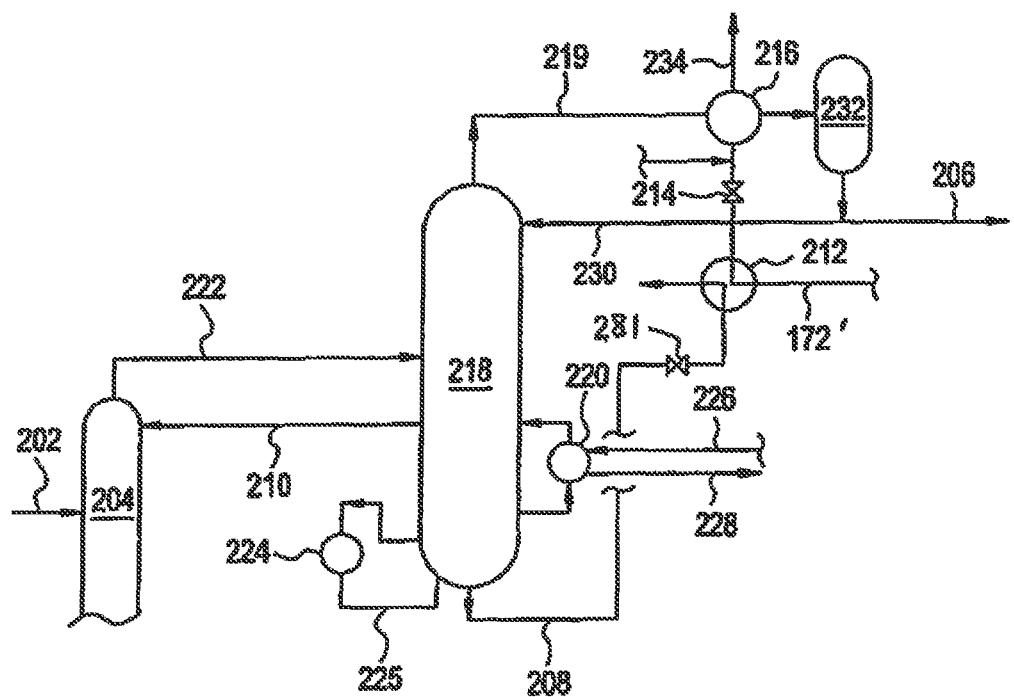
FIG. 3 is a schematic flow diagram, which shows some of the heat exchange concepts utilized in the embodiment of FIG. 2.

In FIG. 3, the C2 fractionator system separates gross feed 202 from a deethanizer 204, into an ethylene product 206, an ethane recycle 208 and a reflux stream 210. Ethane recycle stream 208 is passed across valve 281, letdown to near cracking heater inlet pressure, and then passes through heat exchanger 212. In heat exchanger 212, stream 172' from drum 166 (FIG. 2) is chilled prior to passing across valve 214 (187') and to heat exchanger 216 (178' FIG. 2). The subcooling that occurs in heat exchanger 212 reduces the required flow rate of stream 172' required for the C2 fractionator condenser duty in 216 (178').

FIG. 3 also depicts the relationship of the deethanizer 204 to the C2 fractionator 218. Significantly, there is no overhead condenser for the overhead stream 222 from the deethanizer. Reflux for the deethanizer 204 is supplied by stream 210 drawn off from the C2 fractionator at a point at or just below point that the gross feed from the deethanizer 204, stream 222, enters the C2 fractionator 218. Stream 219 is cooled in heat exchanger 216 and sent to drum 232. A portion of stream 219 from drum 232 returns to the top of the fractionator as stream 230 and the rest is removed as ethylene product in stream 206. The integration of the deethanizer 204 and C2 fractionator 218 in this manner can facilitate the design and operation of the extended binary refrigeration system.

FIG. 3 also depicts an interreboiler 220. The feed to this interreboiler is drawn of from the C2 fractionator 218 at a point in the tower below the entry point of feed stream 222 and above the drawoff of stream 225 to the bottom reboiler, 224. Gross overhead stream 226 from the depropanizer is cooled and partially condensed in the inter-reboiler 220. By integrating with the C2 fractionator in this manner, the load for exchanger 142 (FIG. 2) is reduced. This provides flexibility for the system and reduces the flow of stream 105 withdrawn from heavy liquid refrigerant stream 103 and recycled to the second compression stage. This in turn reduces the power requirements for compressor 150. Stream 228 from the inter-reboiler 220 is a mixture of vapor and liquid and is sent to a drum for separation of vapor product from reflux. Stream 228 may additionally be cooled in other exchangers before this vapor-liquid separation either to satisfy normal operation or startup requirements or both.

Figure 4:
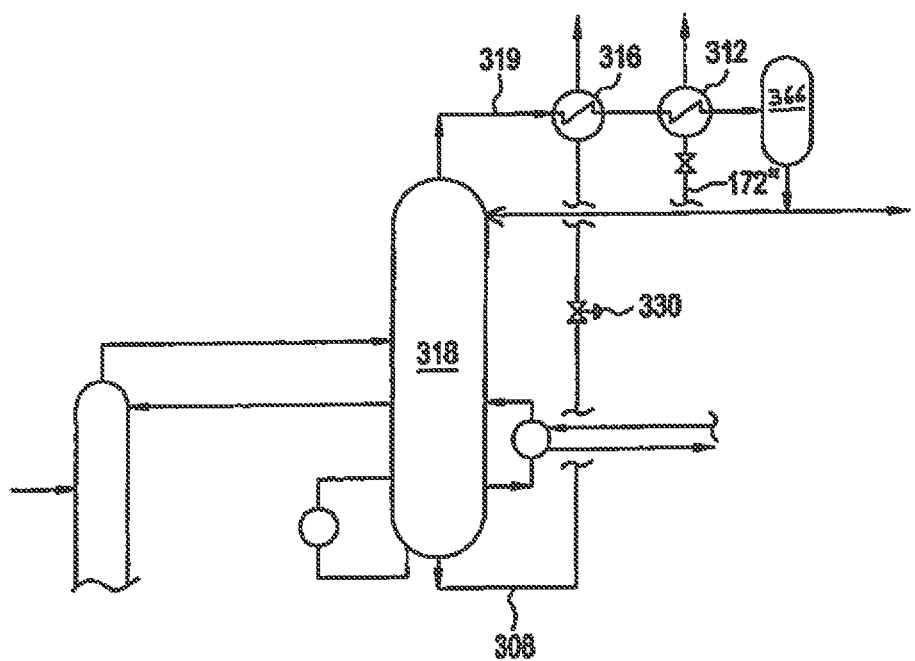
FIG. 4 is a schematic flow diagram, which illustrates additional heat exchange concepts, which can be used as an alternative to certain concepts shown in FIGS. 2 and 3.

FIG. 4 depicts a variation of the FIG. 3 process configuration. In this configuration, stream 308, the ethane recycle withdrawn from the bottom of the C2 fractionator 318, is let down across a valve 330 to near cracking heater inlet pressure and is then passed to a heat exchanger 316 where the C2 recycle is vaporized by partially condensing stream 319 leaving the overhead of the tower 318. The flow of stream 172" from drum 366 is reduced as the duty required of exchanger 312 is reduced by the duty of exchanger 316. As can be seen in FIG. 2, reducing this flow (172 on FIG. 2) reduces the net vapor withdrawn from the second stage discharge as stream 153. This reduces the overall flow of binary refrigerant through the system and the power required for compressor 150.

Net refrigeration loads and power consumption are reduced using the heat exchange concepts in FIGS. 3 and 4. The concepts have the further advantage of facilitating the process design and the operation of the extended binary refrigeration compressor by decreasing the gross flows of the extended binary refrigeration system and thus decreasing the requirements of balancing vapor and liquid loads on the system and specifically on the compressor.

Figure 5:
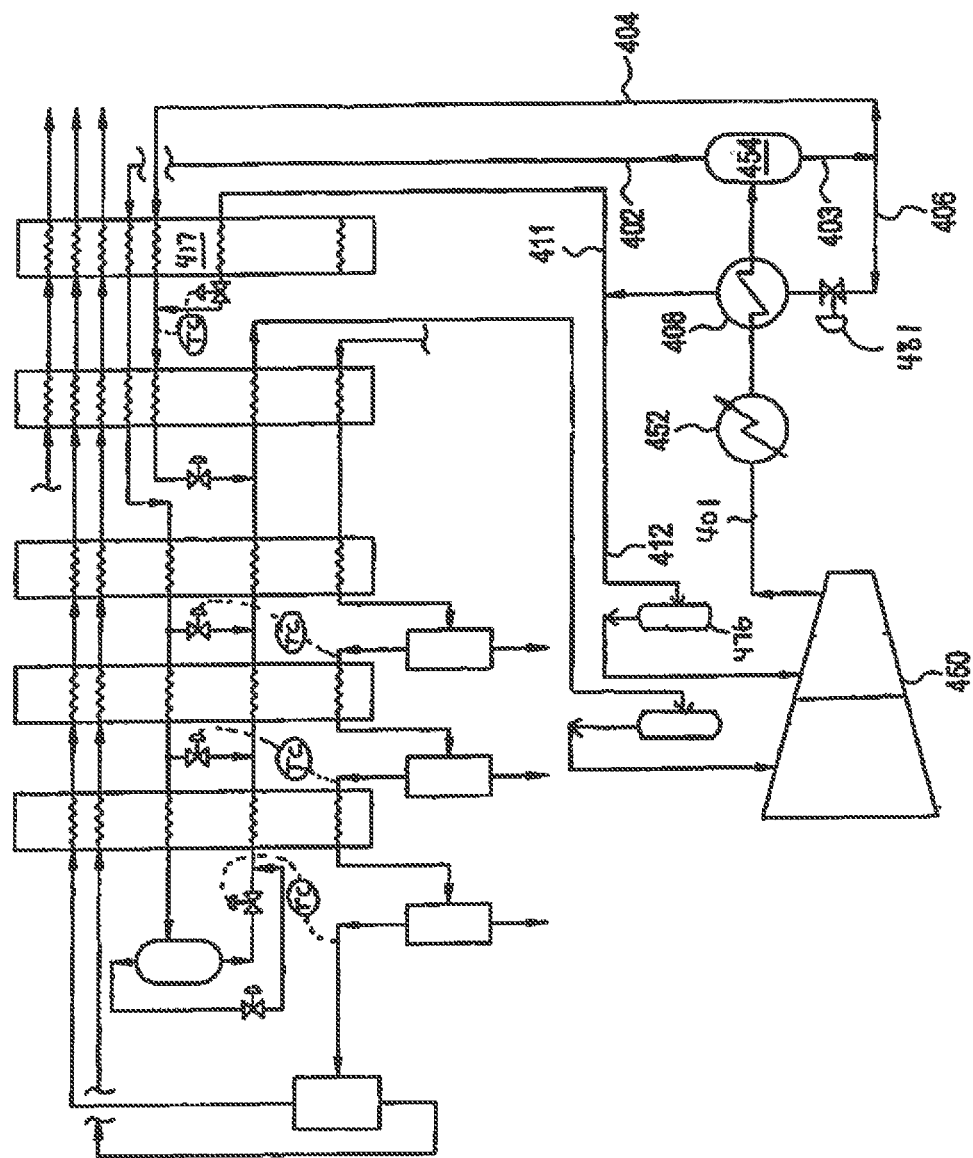
FIG. 5 depicts another embodiment that is particularly applicable when additional refrigeration capability is required due to an expansion of olefin plant production.

FIG. 5 depicts an alternate to the FIG. 1 scheme. In the FIG. 5 process scheme, vapor stream 402 and liquid stream 403 leave the separator drum 454. The final compressor discharge 401 can be cooled further by heat exchange by withdrawing a portion of heavy liquid stream 403 as stream 406, reducing the pressure of this withdrawn liquid across valve 481, and heat exchanging with partially cooled stream 401 in heat exchanger 408, which is downstream from cooling water exchanger 452. As a result of this configuration, the temperature of the cooled stream 401 entering drum 454 is lower than the temperature of stream 401 when it leaves cooling water exchanger 452. Vaporized stream 406 leaving exchanger 408 combined with stream 411 to form stream 412 and is routed to second stage suction drum 476 and enters the compressor 450 at the second suction. The remaining liquid stream 404 from the separator 454 is conveyed through heat exchanger 417. The advantage of this alternate configuration is that the total flow leaving compressor 450 is higher and the pressure is lower than in the process shown in FIG. 1 to achieve the same degree of process refrigeration from the combined system. Volume flow is thus increased greatly and this can be beneficial when the compressor discharge volumetric flow is relatively low and would result in an inefficient centrifugal compressor design.

Figure 6:
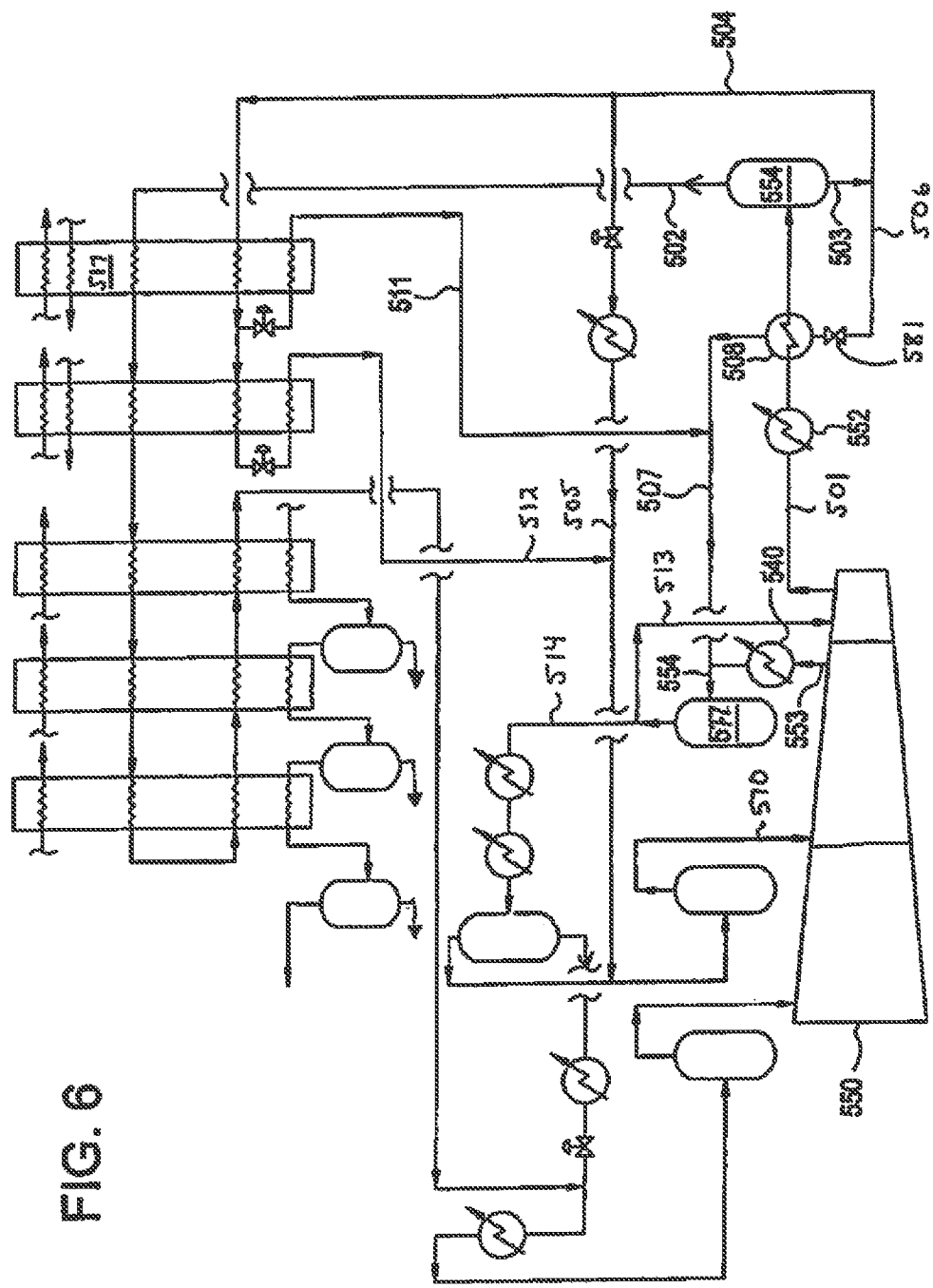
FIG. 6 is a schematic flow diagram showing another embodiment of an extended binary refrigeration system which can be used in a new olefins plant or a major expansion of an existing olefins plant.

FIG. 6 depicts an alternate to the FIG. 2 process scheme where the final discharge stream 501 from the compressor 550 is cooled, separated in drum 554 into liquid stream 503 and vapor stream 502. Additional cooling of stream 501 is effected by withdrawing a portion of heavy liquid stream 503 as stream 506, reducing the pressure of this withdrawn liquid across valve 581, and heat exchanging with stream 501 (after it has left cooling water exchanger 552) in exchanger 508, such that the temperature of the cooled stream 501 entering drum 554 is lower than the temperature of stream 501 leaving cooling water exchanger 552. Stream 506 is then combined with stream 511 to form stream 507, which is routed to second stage discharge drum 577 as part of stream 554, and a portion of this enters the compressor 550 in stream 513 at the third stage suction. The rest of stream 554 exiting from drum 577 forms stream 514, which combines with streams 505 and 512 to form the feed to the second stage of the compressor 550 in stream 570 after providing process duties for the ethylene fractionator reboiler and ethylene fractionator side reboiler. The remaining liquid stream 504 from the separator 554 is conveyed through heat exchanger 517. The advantage of this alternate configuration is that the total flow leaving compressor 550 is higher and the pressure is lower than in the FIG. 2 scheme. Volume flow is thus increased greatly and this can be beneficial when the compressor discharge volumetric flow is otherwise too small to provide for an efficient compressor design. This higher flow is at a pressure higher than for the process shown in FIG. 5 that required two compression stages instead of three as in FIG. 2. The recycle stream 506 is ultimately routed to the second stage discharge drum (third stage suction).

Example

A computerized process simulation was conducted in which an extended binary refrigerant formed from 19 mol % methane and 80.5 mol % propylene (also containing 0.5 mol % hydrogen gas) was used as the refrigerant in the process depicted in FIG. 1. The pressures and compositions of the light refrigerant stream 2, heavy refrigerant stream 3, and the suction stages of the compressor are shown on Table 1 below. The extended binary refrigerant successfully provided for refrigeration in an ethylene plant having a low pressure demethanizer, and also can be used in a plant employing a high pressure demethanizer.

TABLE 1

|  | Compressor Discharge stream (1) mol % | Light Refrigerant Stream (2) mol % | Heavy Refrigerant Stream (3) mol % | Compressor First Stage Suction (14) mol % | Second Stage Suction (11) mol % |
| --- | --- | --- | --- | --- | --- |
| $H_2$ | 0.5 | 1.4 | <500 ppm | 1.2 | <500 ppm |
| $CH_4$ | 19.0 | 41.2 | 7.4 | 36.7 | 7.4 |
| $C_3H_6$ | 80.5 | 57.4 | 92.6 | 62.1 | 92.6 |
| MW | 36.9 | 30.8 | 40.1 | 32.1 | 40.1 |
| Pressure (psia) | 410 | 405 | 405 | 42 | 149 |

What is claimed:

1. A method for the production of olefins from a charge gas containing hydrogen, methane and ethylene wherein said charge gas is cooled by a refrigeration system having a series of heat exchangers, a method for cooling said charge gas and at least one of olefin production reheats comprising:

(a) compressing an extended binary refrigerant vapor containing methane and propylene, in a multistage compressor having a first stage and a last stage with a last stage discharge of 15-25 mol % methane and 75-85 mol % of propylene;

(b) cooling to condense a portion of said extended binary refrigerant vapor from said last stage discharge to form a remaining extended binary refrigerant vapor and a heavy refrigerant stream having a greater percentage of propylene than said selected mixture;

(c) separating said heavy refrigerant stream from said remaining extended binary refrigerant vapor in a separator;

(d) cooling to condense at least a portion of said remaining extended binary refrigerant vapor from said separator to form a light refrigerant stream;

(e) pressure reducing a first portion of the light refrigerant stream across a first valve and cooling a second portion of the light refrigerant stream;

(f) pressure reducing a third portion of the light refrigerant stream across a second valve and cooling a remaining portion of the light refrigerant stream;

(g) pressure reducing the remaining portion of the light refrigerant stream across a third valve, producing a coldest temperature stream in the refrigeration system, wherein the pressure reduced light refrigerant stream provides cooling duty for the charge gas and at least one olefin production process reheat stream;

(h) heating the coldest temperature stream to produce at least one cold demethanizer feed and a heat exchanged light refrigerant stream;

(i) combining the heat exchanged light refrigerant stream with the first portion of the light refrigerant stream and third portion of the light refrigerant stream and feeding the combined light refrigerant stream to the compressing step (a);

(j) cooling the heavy refrigerant stream in the cooling step (d) and pressure reducing the cooled heavy refrigerant stream across a fourth valve producing a pressure reduced heavy refrigerant stream; and (k) feeding the pressure reduced heavy refrigerant stream to the compressing step (a).

2. The method of claim 1, further comprising (l) pressure reducing a first portion the heavy refrigerant stream from step (c) across a fifth valve to provide chilling for a low pressure depropanizer condenser and producing a heavy refrigerant effluent.

3. The method of claim 2, further comprising (m) combining the heavy refrigerant effluent with the pressure reduced heavy refrigerant stream of step (j).

4. The method of claim 1, further comprising (n) pressure reducing a second portion of the heavy refrigerant stream from step (c) across a sixth valve to provide the cooling of step (d).

5. The method of claim 4, further comprising:

(o) feeding the pressure reduced second portion of the heavy refrigerant stream to a compressor discharge drum;

(p) feeding a first portion of the compressor discharge drum overheads to the compressing step (a);

(q) condensing a second portion of the compressor discharge drum overheads in an ethylene fractionator reboiler and an ethylene fractionator side reboiler; and (r) feeding the condensed section portion of the compressor discharge drum overheads to a separator drum, producing a separator drum overheads and a separator drum bottoms.

6. The method of claim 5, farther comprising (s) combining the separator drum overheads of step (r) with the heavy refrigerant effluent with the pressure reduced heavy refrigerant stream of step (m).

7. The method of claim 5, further comprising:

(t) heating the separator drum bottoms in a heat exchanger;

(u) pressure reducing the heated separator drum bottoms across a seventh valve; and (v) combining the pressure reduced separator drum bottoms of step (u) with the combined light refrigerant stream of step (i).

8. A method for the production of olefins from a charge gas containing hydrogen, methane and ethylene wherein said charge gas is cooled by a refrigeration system having a series of heat exchangers, a method for cooling said charge gas and at least one of olefin production reheats comprising:

(a) compressing an extended binary refrigerant vapor containing methane and propylene, in a multistage compressor having a first stage and a last stage with a last stage discharge of methane and greater than 80 mol % of propylene;

(b) cooling to condense a portion of said extended binary refrigerant vapor from said last stage discharge to form a remaining extended binary refrigerant vapor and a heavy refrigerant stream having a greater percentage of propylene than said selected mixture;

(c) separating said heavy refrigerant stream from said remaining extended binary refrigerant vapor in a separator;

(d) cooling to condense at least a portion of said remaining extended binary refrigerant vapor from said separator to form a light refrigerant stream, without additional separation between steps (c) and (d);

(e) pressure reducing a first portion of the light refrigerant stream across a first valve and cooling a second portion of the light refrigerant stream;

(f) pressure reducing a third portion of the light refrigerant stream strewn across a second valve and cooling a remaining portion of the light refrigerant stream;

(g) pressure reducing the remaining portion of the light refrigerant stream across a third valve, producing a coldest temperature stream in the refrigeration system, wherein the pressure reduced light refrigerant stream provides cooling duty for the charge gas and at least one olefin production process reheat stream;

(h) heating the coldest temperature stream to produce at least one cold demethanizer feed and a heat exchanged light refrigerant stream;

(i) combining the heat exchanged light refrigerant stream with the first portion of the light refrigerant stream and third portion of the light refrigerant stream and feeding the combined light refrigerant stream to the compressing step (a);

(j) cooling the heavy refrigerant stream in the cooling step (d) and pressure reducing the cooled heavy refrigerant stream across a fourth valve producing a pressure reduced heavy refrigerant stream;

(k) feeding the pressure reduced heavy refrigerant stream to the compressing step (a);

(l) pressure reducing a first portion the heavy refrigerant stream from step (c) across a fifth valve to provide chilling for a low pressure depropanizer condenser and producing a heavy refrigerant effluent;

(m) combining the heavy refrigerant effluent with the pressure reduced heavy refrigerant stream of step (j); and (n) pressure reducing a second portion of the heavy refrigerant stream from step (c) across a sixth valve to provide the cooling of step (d).

9. The method of claim 8, further comprising:

(o) feeding the pressure reduced second portion of the heavy refrigerant stream to a compressor discharge drum;

(p) feeding a first portion of the compressor discharge drum overheads to the compressing step (a);

(q) condensing a second portion of the compressor discharge drum overheads in an ethylene fractionator reboiler and an ethylene fractionator side reboiler; and (r) feeding the condensed section portion of the compressor discharge drum overheads to a separator drum, producing a separator drum overheads and a separator drum bottoms.

10. The method of claim 9, further comprising (s) combining the separator drum overheads of step (r) with the heavy refrigerant effluent with the pressure reduced heavy refrigerant stream of step (m).

11. The method of claim 9, further comprising:

(t) heating the separator drum bottoms in a heat exchanger;

(u) pressure reducing the heated separator drum bottoms across a seventh valve; and (v) combining the pressure reduced separator drum bottoms of step (u) with the combined light refrigerant stream of step (i).

12. The method of claim 9, further comprising (w) recovering a second sage discharge vapor from the multistage compressor;

(x) cooling the second stage discharge vapor in a second heat exchanger;

(y) recovering a cooled second stage discharge vapor; and (z) combining the cooled second stage discharge vapor with the heavy refrigerant stream of step (o) upstream of the compressor discharge drum.

* * * * *